(12) United States Patent
Deng et al.

(10) Patent No.: US 11,091,111 B2
(45) Date of Patent: Aug. 17, 2021

(54) SIDE AIRBAG INCLUDING LOWER LOBE AND UPPER LOBE

(71) Applicant: Ford Global Technologies, LLC, Dearborn, MI (US)

(72) Inventors: Zhibing Deng, Northville, MI (US); Alison Callaghan, Royal Oak, MI (US); Deepak Patel, Canton, MI (US); Michelle Carolina Herrera Gutierrez, Mexico City (MX); Joseph Edward Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 16/589,807

(22) Filed: Oct. 1, 2019

(65) Prior Publication Data
US 2021/0094499 A1   Apr. 1, 2021

(51) Int. Cl.
*B60R 21/231* (2011.01)
*B60N 2/14* (2006.01)
(Continued)

(52) U.S. Cl.
CPC ............ *B60R 21/207* (2013.01); *B60N 2/143* (2013.01); *B60R 21/013* (2013.01); *B60R 21/239* (2013.01); *B60R 21/2338* (2013.01); *B60R 21/2346* (2013.01); *B60R 21/23138* (2013.01); *B60R 21/261* (2013.01); *B60R 21/264* (2013.01); *B60R 21/2342* (2013.01); *B60R 2021/0009* (2013.01); *B60R 2021/2076* (2013.01); *B60R 2021/2395* (2013.01); *B60R 2021/23107* (2013.01); *B60R 2021/23146* (2013.01); *B60R 2021/23324* (2013.01); *B60R 2021/23382* (2013.01); *B60R 2021/23386* (2013.01); *B60R 2021/2612* (2013.01)

(58) Field of Classification Search
CPC .... B60R 2021/23146; B60R 21/23138; B60R 21/013; B60R 21/2338; B60R 2021/23382; B60R 2021/23384; B60R 2021/23386; B60R 2021/23388; B60R 2021/2395; B60R 2021/2612; B60R 21/233; B60R 2021/01315; B60R 21/276; B60R 2021/2765; B60R 21/207; B60R 21/231
See application file for complete search history.

(56) References Cited

U.S. PATENT DOCUMENTS

| 5,718,450 A * | 2/1998 | Hurford | ............ B60R 21/23138 280/730.2 |
| 5,730,464 A * | 3/1998 | Hill | .................. B60R 21/23138 280/730.2 |

(Continued)

FOREIGN PATENT DOCUMENTS

DE   202018004452 U1 * 10/2018   ........... B60R 21/233

*Primary Examiner* — Paul N Dickson
*Assistant Examiner* — Maxwell L Meshaka
(74) *Attorney, Agent, or Firm* — Frank A. MacKenzie; Bejin Bieneman PLC

(57) ABSTRACT

An airbag assembly includes a housing and a side airbag inflatable to an inflated position. The side airbag in the inflated position has an upper lobe and a lower lobe supporting the upper lobe on the housing. The side airbag includes an internal panel between the upper lobe and the lower lobe. A tether has a first end anchored to the housing and a second end anchored to the upper lobe.

20 Claims, 8 Drawing Sheets

(51) Int. Cl.
  *B60R 21/00*       (2006.01)
  *B60R 21/233*      (2006.01)
  *B60R 21/207*      (2006.01)
  *B60R 21/2338*     (2011.01)
  *B60R 21/239*      (2006.01)
  *B60R 21/2346*     (2011.01)
  *B60R 21/261*      (2011.01)
  *B60R 21/264*      (2006.01)
  *B60R 21/013*      (2006.01)
  *B60R 21/2342*     (2011.01)

(56) References Cited

U.S. PATENT DOCUMENTS

| | | | |
|---|---|---|---|
| 5,803,485 A * | 9/1998 | Acker | B60R 21/207 |
| | | | 280/728.2 |
| 6,065,772 A * | 5/2000 | Yamamoto | B60R 21/207 |
| | | | 280/730.2 |
| 7,431,329 B2 * | 10/2008 | Taguchi | B60R 21/23138 |
| | | | 280/729 |
| 7,559,573 B2 * | 7/2009 | Fukawatase | B60R 21/23138 |
| | | | 280/730.2 |
| 7,637,530 B2 * | 12/2009 | Yamaji | B60R 21/23138 |
| | | | 280/730.2 |
| 9,290,151 B2 * | 3/2016 | Fujiwara | B60R 21/231 |
| 9,682,681 B1 * | 6/2017 | Patel | B60R 21/01512 |
| 9,994,181 B1 | 6/2018 | Dubaisi et al. | |
| 10,864,881 B2 * | 12/2020 | Park | B60R 21/207 |
| 2006/0131845 A1 * | 6/2006 | Belwafa | B60R 21/23138 |
| | | | 280/729 |
| 2006/0202452 A1 * | 9/2006 | Breed | B60R 21/30 |
| | | | 280/730.2 |
| 2008/0179867 A1 | 7/2008 | Riedel et al. | |
| 2011/0316264 A1 | 12/2011 | Maruyama | |
| 2014/0151984 A1 * | 6/2014 | Fukawatase | B60R 21/23138 |
| | | | 280/730.2 |
| 2014/0375032 A1 * | 12/2014 | Fukawatase | B60R 21/239 |
| | | | 280/729 |
| 2017/0036634 A1 * | 2/2017 | Ohno | B60N 2/90 |
| 2019/0061671 A1 * | 2/2019 | Jang | B60R 21/2338 |
| 2019/0111880 A1 * | 4/2019 | Choi | B60R 21/2338 |
| 2019/0283700 A1 * | 9/2019 | Kwon | B60R 21/207 |

* cited by examiner

SIDE AIRBAG INCLUDING LOWER LOBE AND UPPER LOBE

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
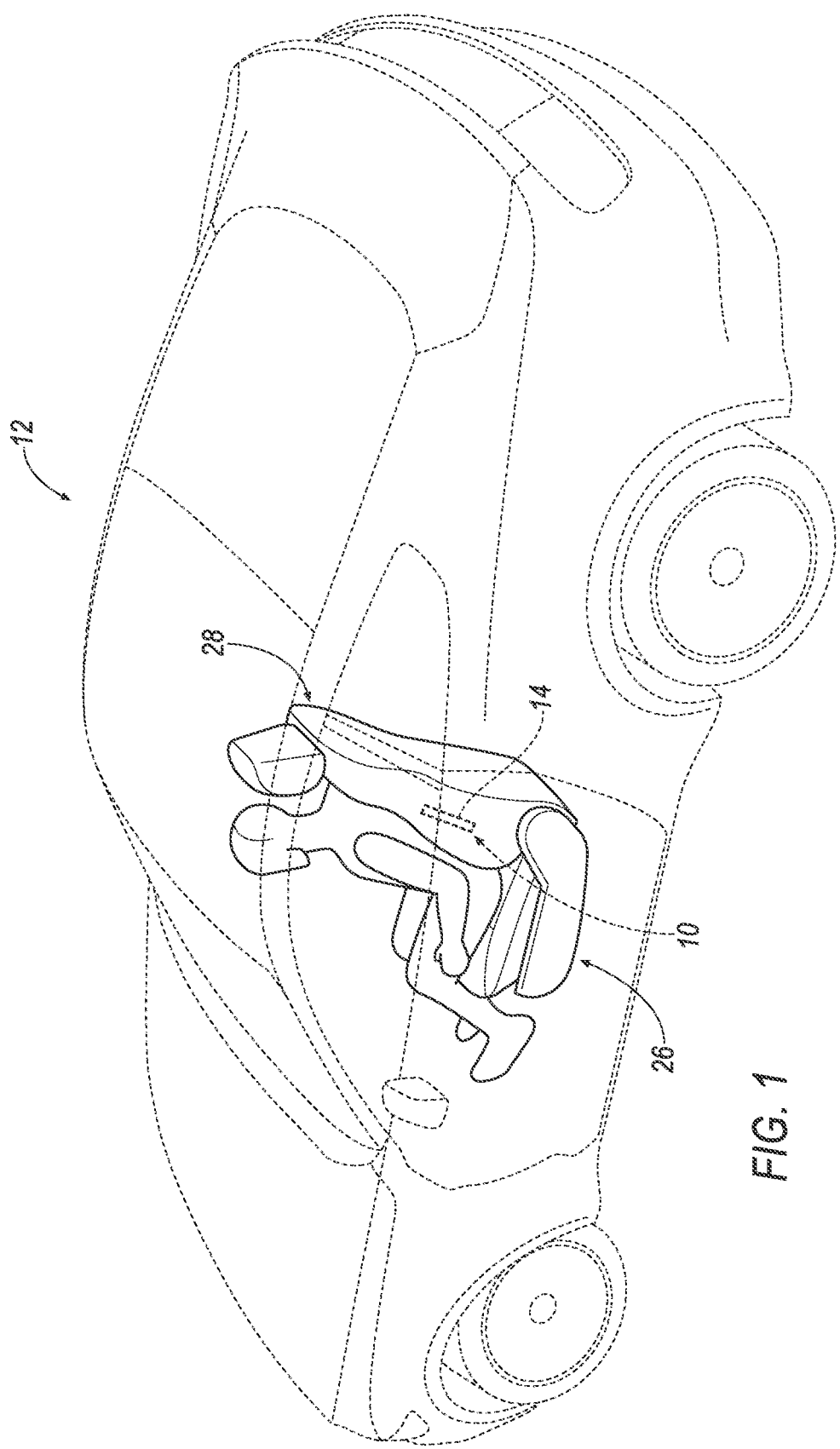
FIG. 1 is a perspective view of a vehicle including a seat assembly including two airbag assemblies.

An airbag assembly includes a housing. A side airbag is inflatable to an inflated position. The side airbag in the inflated position has an upper lobe and a lower lobe supporting the upper lobe on the housing. The side airbag includes an internal panel between the upper lobe and the lower lobe. A tether has a first end anchored to the housing and a second end anchored to the upper lobe.

The airbag assembly may have a tether release supported by the housing and connected to the first end of the tether. The second end of the tether is connected to an exterior surface of the upper lobe. The airbag may include an elongated duct having an opening in the lower lobe and extending into the lower lobe. The tether may extend from the tether release through the elongated duct to the exterior surface of the upper lobe.

The second end of the tether may be connected to an exterior surface of the upper lobe.

The airbag may include an elongated duct having an opening in the lower lobe and extending into the lower lobe, the tether extending through the elongated duct to the upper lobe. The first end of the tether may be in the elongated duct.

The airbag assembly may include a tether release supported by the housing and connected to the first end of the tether in the elongated duct.

The internal panel may fluidly separate the upper lobe from the lower lobe, and further comprising an inflator and a diffuser extending from the inflator through the internal panel to the upper lobe.

The internal panel may have a vent. The airbag assembly second tether may have a first end anchored to the housing and a second end anchored to the vent. The airbag assembly may include a second tether release supported by the housing and connected to the first end of the second tether. The vent may be a non-return vent.

The upper lobe may have an outer wall that is substantially impermeable to inflation medium.

A system includes a seat including a seatback a first side and a second side; a first side airbag on the first side of the seat and a second side airbag on the second side of the seat; and a computer programmed to selectively inflate the first side airbag and/or the second side airbag based on at least a direction of a vehicle impact.

The computer may be programmed to selectively inflate one of the first side airbag or the second side airbag based on at least detection of a near-side vehicle impact and/or to selectively inflate the other of the first side airbag or the second side airbag based on at least detection of a far-side vehicle impact.

The first side airbag and the second side airbag may each include a lower lobe and an upper lobe restrained by an external tether, and the computer may be programmed to selectively release the external tether of one of the first side airbag or the second side airbag based on at least the direction of the vehicle impact.

The seat may be rotatable between a forward position and a rearward position and the computer may be programmed to selectively inflate the first side airbag or the second side airbag based on at least a position of the seat in one of the forward position and the rearward position.

The first side airbag and the second side airbag may each include a lower lobe, an upper lobe, and an external vent in the lower lobe; and the computer may be programmed to open the external vent of one of the first side airbag or the second side airbag based on at least the direction of the vehicle impact.

The first side airbag and the second side airbag may each include a lower lobe, and upper lobe, an internal panel between the lower lobe and the upper lobe, the internal panel including a vent; and the computer may be programmed to selectively release the vent of one of the first side airbag and the second side airbag based on at least the direction of the vehicle impact.

With reference to the Figures, wherein like numerals indicate like parts throughout the several views, an airbag assembly 10 of a vehicle 12 is generally shown. The airbag assembly 10 includes a housing 14 and a side airbag 16 inflatable to an inflated position. The side airbag 16 in the inflated position has an upper lobe 18 and a lower lobe 20 supporting the upper lobe 18 on the housing 14. The side airbag 16 includes an internal panel 24 between the upper lobe 18 and the lower lobe 20. A tether 22 has a first end anchored to the housing 14 and a second end anchored to the upper lobe 18.

The upper lobe 18 and/or the lower lobe 20 control the kinematics of a vehicle occupant. Specifically, the internal panel 24 between the upper lobe 18 and the lower lobe 20 controls differences in stiffness between the upper lobe 18 and the lower lobe 20. The tether 22 controls the positioning of the upper lobe 18 relative to the lower lobe 20. In one example, as shown in the Figures, the tether 22 may restrain the upper lobe 18 in a restrained position or may release the tether 22 to an unrestrained position.

Figure 2:
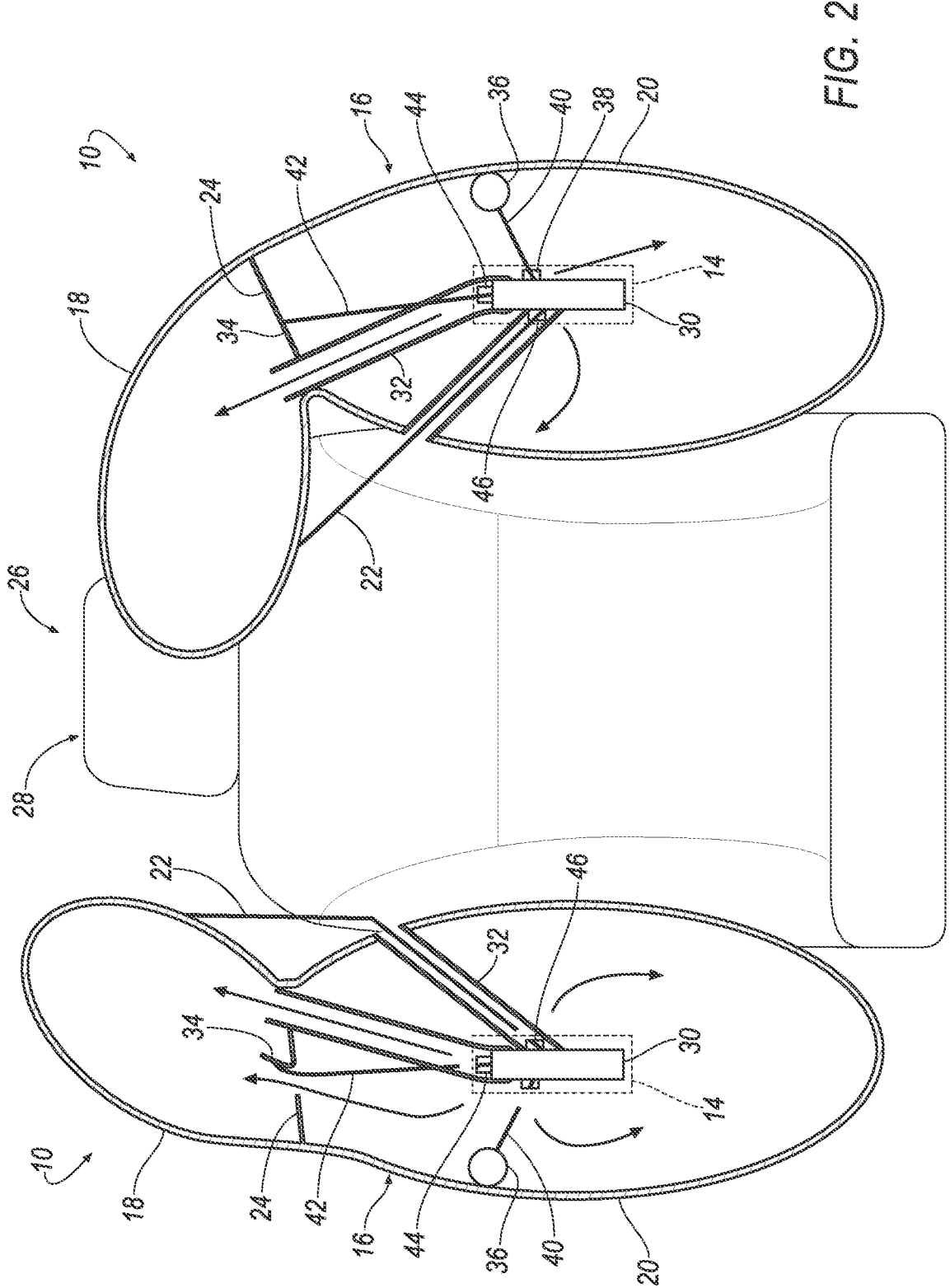
FIG. 2 is a front view the seat assembly with airbags of the airbag assemblies inflated.

The vehicle 12 includes a seat assembly 26 that includes the airbag assembly 10. Specifically, the seat assembly 26 may include two airbag assemblies 10, as shown in FIGS. 1 and 2. In such examples, the two airbag assemblies 26 may be mirror images of each other and otherwise identical, as shown in FIG. 2. Common numerals are used to identify the common features of the two airbag assemblies 26.

In examples in which the seat assembly 26 includes two airbag assemblies 26, the side airbags 16 are independently inflated, i.e., the side airbag 16 of either airbag assembly 10 can be inflated or not inflated independently of the other and/or may be inflated at different times. For illustrative purposes, both side airbags 16 are shown inflated in FIG. 2; however, one of the side airbags 16 may be inflated and the other of the side airbags 16 may remain uninflated, as described further below. The shape of each side airbag 16 is controlled independently of the other side airbag 16. The relative pressure of the upper lobe 18 and the lower lobe 20 of each side airbag 16 is controlled independently of the other side airbag 16. Accordingly, the side airbags 16 may be selectively inflated and selectively shaped and pressurized based on a detected direction of a vehicle impact. In addition, as described further below, the seat assembly 26 may be rotatable and the inflation, shape, and pressurization of the side airbags 16 may be selected based on the facing direction of the seat assembly 26.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example may be an autonomous vehicle. In other words, the vehicle 12 may be autonomously controlled such that the vehicle 12 may be driven without constant attention from a driver. A computer can be programmed to operate the vehicle 12 independently of the intervention of a human driver, completely or to a lesser degree. The computer may be programmed to operate the propulsion, brake system, steering, and/or other vehicle 12 systems based at least in part on data received from the sensor. For purposes of this disclosure, autonomous operation means the computer controls the propulsion, brake system, and steering without input from a human driver; semi-autonomous operation means the computer controls one or two of the propulsion, brake system, and steering and a human driver controls the remainder; a nonautonomous operation means a human driver controls the propulsion, brake system, and steering.

With reference to FIG. 1, the vehicle 12 includes a passenger cabin (not numbered) to house occupants, if any, of the vehicle 12. The vehicle 12 includes a roof above the passenger cabin and a floor below the passenger cabin. The vehicle 12 may include a front dash and/or a front windshield that are vehicle-forward of the passenger cabin (where "vehicle-forward" is with reference to forward movement of the vehicle 12).

With reference to FIG. 1, the vehicle 12 includes one or more seat assemblies 26 each including a seat. The example shown in FIG. 1 includes one seat assembly 26, and the vehicle 12 may include any suitable number of seat assemblies 26. The seat assemblies 26 may be arranged in the passenger cabin in any suitable position, i.e., as front seats, rear seats, third-row seats, etc. The seat assemblies 26 may be movable relative to the floor to various positions, e.g., movable fore-and-aft and/or cross-vehicle 12. The seat assemblies 26 may be of any suitable type, e.g., a bucket seat as shown in FIG. 1. Any number or all of the seat assemblies 26 may include at least one airbag assembly 10. In the example shown in the figures, each of the seat assemblies 26 includes two airbag assemblies 26.

Each seat assembly 26 may rotate about a vertical axis that extends through the roof and the floor. For example, the seat assemblies 26 may rotate between a forward-facing position, a rearward-facing position, a rightward-facing position, a leftward-facing position, and/or positions therebetween. In the forward-facing position, an occupant of the seat assembly 26 faces the front dash. The seat assemblies 26 may rotate completely, i.e., 360°, about the vertical axis. The seat assemblies 26 may rotate between fixed positions, e.g., the forward-facing position and the rearward-facing position, or may be rotatable to an infinite number of positions. The seat assembly 26 may be positioned in the passenger cabin offset from a longitudinal centerline of the vehicle 12. In such examples, the seat assembly 26 includes an inboard side and an outboard side. The inboard side faces the longitudinal centerline and the outboard side is farther from the longitudinal centerline. The outboard side and the inboard side switch when the seat is rotated between a forward-facing and rearward-facing position.

The seat assembly 26 includes a seatback 28 and a seat bottom (not numbered). The seatback 28 may be supported by the seat bottom and may be stationary or movable relative to the seat bottom. The seatback 28 and the seat bottom may be adjustable in multiple degrees of freedom. Specifically, the seatback 28 and the seat bottom may themselves be adjustable, in other words, adjustable components within the seatback 28 and/or the seat bottom, and/or may be adjustable relative to each other.

The seatback 28 includes a first side, a second side, a front extending between the first side to the second side, and a rear extending between the first side to the second side. When the seat is in the forward-facing position, the front of the seat faces vehicle-forward and the rear of the seat faces vehicle-rearward. The seatback 28 defines an occupant seating area on the front between the first side and the second side. When the occupant occupies the seat assembly 26, the back of the occupant leans against the occupant seating area. The airbag assemblies 26 are arranged as side airbag assemblies. In other words, the side airbags 16 inflate along the occupant seating area along a side of a torso of an occupant. In examples in which one seat assembly 26 includes two airbag assemblies 26, one side airbag 16 inflates from the first side of the seat back and the other side airbag 16 inflates from the second side of the seatback 28, i.e., on opposite sides of the occupant seating area.

The seatback 28 may include a seatback frame and a covering supported on the seatback frame. The seatback frame may include tubes, beams, etc. Specifically, the seatback frame includes a pair of upright frame members at the first side and the second side, respectively, of the seatback 28. Each airbag assembly 10 may be supported by one of the upright frame members. The upright frame members are elongated and specifically, are elongated in a generally upright direction when the seatback 28 is in a generally upright position. The upright frame members are spaced from each other and the seatback frame includes cross-members extending between the upright frame members. The seatback frame may be of any suitable plastic material, e.g., carbon fiber reinforced plastic (CFRP), glass fiber reinforced semi-finished thermoplastic composite (organosheet), etc. As another example, some or all components of the seatback frame may be a suitable metal, e.g., a steel, aluminum, etc.

The covering may include upholstery and padding. The upholstery may be cloth, faux leather, or any other suitable material. The upholstery may be stitched in panels around the frame. The padding may be between the covering and the seatback frame and may be foam or any other suitable material. The covering may include a tear seam adjacent to the airbag assembly 10. The side airbag 16 tears and extends through the tear seam in the inflated position.

The airbag assembly 10 may include the housing 14, the side airbag 16, and an inflator 30. As set forth above, each seat assembly 26 may include two airbag assemblies 26, as shown in the Figures. For example, one airbag assembly 10 may be at the first end of the seatback 28 and another airbag assembly 10 may be at the second end of the seatback 28. In such an example, the airbag assemblies 26 may be mounted to the seatback frame, e.g., the upright frame members. For example, the housing 14 may include locating elements, fasteners, etc., that engage the seatback 28 and/or fasteners may engage the housing 14 and the seatback 28 to mount the housing 14 to the seatback 28.

The side airbag 16 is supported by the seatback 28, e.g., by the housing 14, when the side airbag 16 is uninflated and when the side airbag 16 is in the inflated position. For example, the side airbag 16 may be folded in the housing 14 when the side airbag 16 is uninflated. The housing 14 may be mounted to the seatback frame, as described above, and/or may be a component of the seatback frame. The housing 14 may be, for example, plastic. The airbag assembly 10 may be concealed by the cover and may break through the tear seam as the side airbag 16 inflates to the inflated position.

As set forth above, the side airbag 16 has an upper lobe 18 and a lower lobe 20. In the inflated position, the lower lobe 20 supports the upper lobe 18 on the housing 14. In other words, in the inflated position, the lower lobe 20 extends from the housing 14 and the upper lobe 18 extends from the lower lobe 20. The lower lobe 20 is between the upper lobe 18 and the housing 14.

The side airbag 16 has two inflation chambers that are independently inflatable to and/or maintained at separate pressures. Specifically, the upper lobe 18 has an inflation chamber and the lower lobe 20 has an inflation chamber. The lower lobe 20 and the upper lobe 18 each have an interior surface facing the respective inflation chamber and an exterior surface facing the passenger cabin in the inflated position.

As set forth above, the internal panel 24 is between the upper lobe 18 and the lower lobe 20. The internal panel 24 fluidly separates the upper lobe 18 and the lower lobe 20. Specifically, the internal panel 24 fluidly separates the inflation chambers of the upper lobe 18 and the lower lobe 20. In other words, the internal panel 24 prevents or limits fluid flow therethrough to allow the upper lobe 18 and the lower lobe 20 to have different pressures. The stiffnesses of the upper lobe 18 and the lower lobe 20 result from the pressure in the upper lobe 18 and the lower lobe 20, i.e., higher pressure results in higher stiffness. As one example, the internal panel 24 may be substantially impermeable to substantially prevent fluid flow therethrough. As another example, the internal panel 24 may allow a small amount of fluid flow therethrough at a rate small enough to allow the upper lobe 18 and the lower lobe 20 to have different pressures during operation, e.g., with small open vents that allow a relatively small pressure change.

The side airbag 16 may be of any suitable type of material, e.g., a woven polymer. For example, the side airbag 16 may be a woven nylon yarn, e.g., nylon 6, 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The side airbag 16 may be a single continuous unit, e.g., a single piece of fabric. Alternatively, the side airbag 16 may include a plurality of segments, i.e., two or more, that are attached to each other in any suitable fashion, e.g., a plurality of panels attached by stitching, ultrasonic welding, etc.

The inflator 30 is in fluid communication with the side airbag 16. As an example shown in the Figures, the inflator 30 may be disposed in the lower lobe 20, i.e., may have an end open to the lower lobe 20 and expelling inflation medium directly into the lower lobe 20. As also in the example shown in the Figures, the inflator 30 may supply inflation medium indirectly the upper lobe 18, e.g., through the lower lobe 20 and/or a diffuser 32 (described further below). The inflator 30 expands the side airbag 16 with inflation medium, such as a gas, to move the airbag from the uninflated position to the inflated position. The inflator 30 may be supported by any suitable component. For example, the inflator 30 may be supported by the housing 14, the seatback frame, etc. The inflator 30 may be, for example, a pyrotechnic inflator 30 that ignites a chemical reaction to generate the inflation medium, a stored gas inflator 30 that releases (e.g., by a pyrotechnic valve) stored gas as the inflation medium, or a hybrid.

As set forth above, the relative pressure of the lower lobe 20 and the upper lobe 18 is controlled. Specifically, as examples, the relative pressure may be controlled by the diffuser 32, a vent 34 on the internal panel 24, an exhaust vent 36 in the lower lobe 20, and/or permeability of the outer wall of the upper lobe 18. In the examples shown in the Figures, the relative pressure is controlled by each of the diffuser 32, the vent 34 on the internal panel 24, and the exhaust vent 36 in the lower lobe 20. In such an example, the material upper lobe 18 may be coated (e.g., with silicone, neoprene, urethane, polyorganosiloxane, etc.) to substantially prevent gas flow through the material of the upper lobe 18. In another example, the relative pressure is controlled by the diffuser 32 and the exhaust vent 36 in the lower lobe 20 (i.e., in such an example the airbag assembly 10 does not include the vent on the internal panel 24). In such an example, the material of the upper lobe 18 may be uncoated such that some gas flows through the material of the upper lobe 18 to decrease the stiffness of the upper lobe 18.

In the example shown in the Figures, the diffuser 32 extends from the inflator 30 through the internal panel 24 to the upper lobe 18. Specifically, the diffuser 32 has a first end and a second end. The first end of the diffuser 32 is anchored to the housing 14 and the second end of the diffuser 32 is anchored to the internal panel 24. The inflator 30 feeds the diffuser 32 with inflation medium and the diffuser 32 delivers the inflation medium to the upper lobe 18.

The exhaust vent 36 in the lower lobe 20 allows for exhaust of inflation medium from the lower lobe 20 to the atmosphere to reduce stiffness of the lower lobe 20. The exhaust vent 36 may be an active vent in which the exhaust vent 36 is movable from a closed position and an open position. In the closed position the exhaust vent 36 does not exhaust from the lower lobe 20 to the atmosphere. In the open position the exhaust vent 36 exhausts inflation medium to the atmosphere.

In examples in which the exhaust vent 36 is an active vent, the airbag assembly 10 may include a tether release 38 and a tether 40. The tether release 38 may be, for example, anchored to the housing 14. The tether 40 has a first end and a second end. The first end of the tether 40 is anchored to the housing 14, and the second end of the tether 40 is anchored to the exhaust vent 36. The tether release 38 releases the tether 40 to open the exhaust vent 36 to decrease the stiffness of the lower lobe 20.

As set forth above, some examples of the airbag assembly 10 include the vent 34 on the internal panel 24. The vent 34 on the internal panel 24. The vent 34 allows for flow of the inflation medium from the lower lobe 20 to the upper lobe 18 to increase the stiffness of the upper lobe 18. The vent 34 may be a non-return vent. In other words, the vent 34 allows airflow from the lower lobe 20 to the upper lobe 18 and prevents airflow from the upper lobe 18 to the lower lobe 20. The vent 34 may be an active vent. For example, a tether 42 may retain the vent 34 in a closed position and may release the vent 34 to an open position. The tether 42 has a first end that may be anchored to the housing 14 and a second end anchored to the vent 34. A tether release 44 releases the tether 42 to open the vent 34. This decrease the stiffness of the lower lobe 20 and increases the stiffness of the upper lobe 18.

As set forth above, the position of the upper lobe 18 relative to the lower lobe 20 is controlled. Specifically, as set forth above, the tether 22 has a first end anchored to the housing 14 and a second end anchored to the upper lobe 18. As an example, the airbag assembly 10 may include a tether release 46 supported by the housing 14 and connected to the first end of the tether 22. The tether release 46 retains the upper lobe 18 in the restrained position or releases the unrestrained position by releasing the tether 22 relative to the housing 14.

The side airbag 16 may include an elongated duct 48 and the tether 22 may extend through the elongated duct 48 from the housing 14, e.g., from the tether release 46 supported by the housing 14, to the upper lobe 18, e.g., to the exterior surface of the upper lobe 18. The elongated duct 48 fluidly separates the restraining tether 22 from the lower lobe 20. The elongated duct 48 may have an opening in the lower lobe 20. The elongated duct 48 extends into the lower lobe 20, e.g., to the tether release 46. The tether release 46 may be disposed in the elongated duct 48, e.g., separated from the inflation chamber of the lower lobe 20.

The tether releases 38, 44, 46 may be of the same type or may be different types. For example, the tether releases 38, 44, 46 may be pyrotechnic. In such examples, the tether release 38, 44, 46 includes a pin that is withdrawn from a loop on the tether to release the tether 22, 40, 42, a cutter to cut the tether 22, 40, 42, etc.

In the inflated position, the side airbag 16 is positioned along the side of the occupant, e.g., along the torso, hip, and/or head of the occupant. The side airbag 16 controls the kinematics of the occupant in vehicle impacts that urge the occupant in a cross-vehicle 12 direction, e.g., a side impact, oblique impact, etc. Specifically, in the inflated position, the lower lobe 20 is positioned adjacent to the torso, the pelvic area (e.g., hip, buttocks) and/or the upper leg. In the inflated position, the upper lobe 18 is positioned adjacent to the upper torso, the shoulder, and/or the head and neck. In the restrained position, the upper lobe 18 is generally positioned toward the sagittal plane of the occupant. In the unrestrained position, the upper lobe 18 is generally in an upright position.

As set forth above, the position of the upper lobe 18 and the relative pressures of the upper lobe 18 and the lower lobe 20 are controlled. Specifically, the position of the upper lobe 18 and the relative pressures of the upper lobe 18 and the lower lobe 20 may be controlled based the direction of vehicle impact and/or the facing direction of the seat. Use of "in response to," "based on," and "upon determining" herein indicates a causal relationship, not merely a temporal relationship. As set forth above, the seat may be rotated to face different directions. As an example, when a vehicle 12 is subjected to a side impact or an oblique impact, the occupants are urged in a direction toward the impact. In such instances, the impact is a near-side impact or a far side-impact relative to the occupant location in the vehicle 12.

A far-side impact is an impact to the vehicle 12 in an opposite side of the vehicle 12 from the seat assembly 26, which urges the occupant inboard, i.e., toward a longitudinal centerline of the vehicle 12. A near-side impact is an impact to the vehicle 12 on the same side of the vehicle 12 as the seat assembly 26, which urges the occupant outboard, i.e., away from the longitudinal centerline of the vehicle 12.

Figure 3:
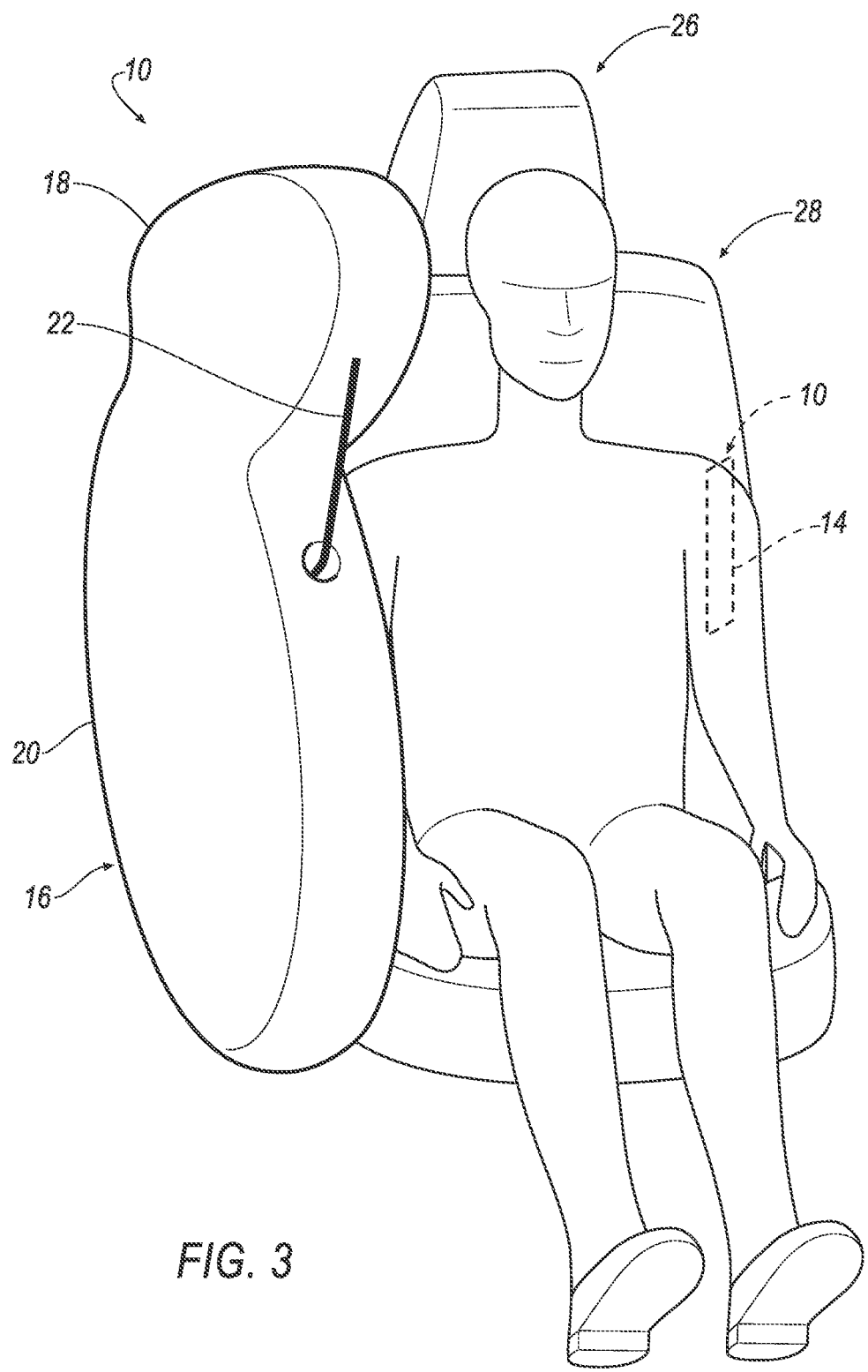
FIG. 3 is a perspective view of the seat assembly with one of the airbags inflated and with tethers released.
Figure 4:
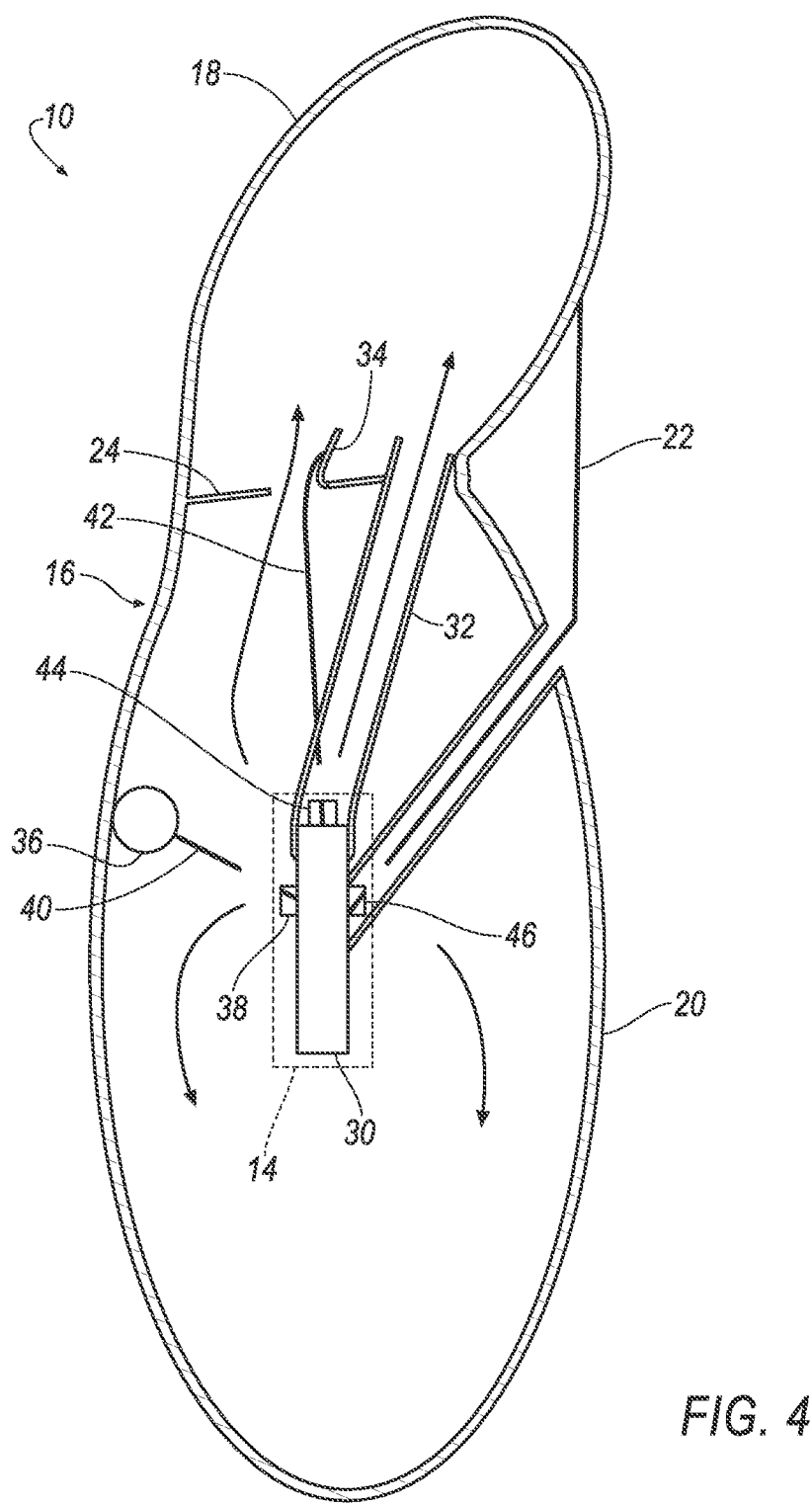
FIG. 4 is a cross-sectional view of the airbag of FIG. 3.

For a near-side impact, the airbag closest to the impact, i.e., the side airbag 16 on the outboard side of the seat assembly 26, may be inflated with the upper lobe 18 in the unrestrained position, the lower lobe 20 at a relatively decreased stiffness, and the upper lobe 18 at a relatively increased stiffness. As an example, the seat assembly 26 in FIGS. 3 and 4 may be located on a right side of the vehicle 12 and facing forward during a near-side impact, i.e., an impact on the right side of the vehicle 12. In such an example, the upper lobe 18 may be released to the unrestrained position and the vents may be opened to increase the stiffness of the upper lobe 18 and decrease the stiffness of the lower lobe 20.

Figure 5:
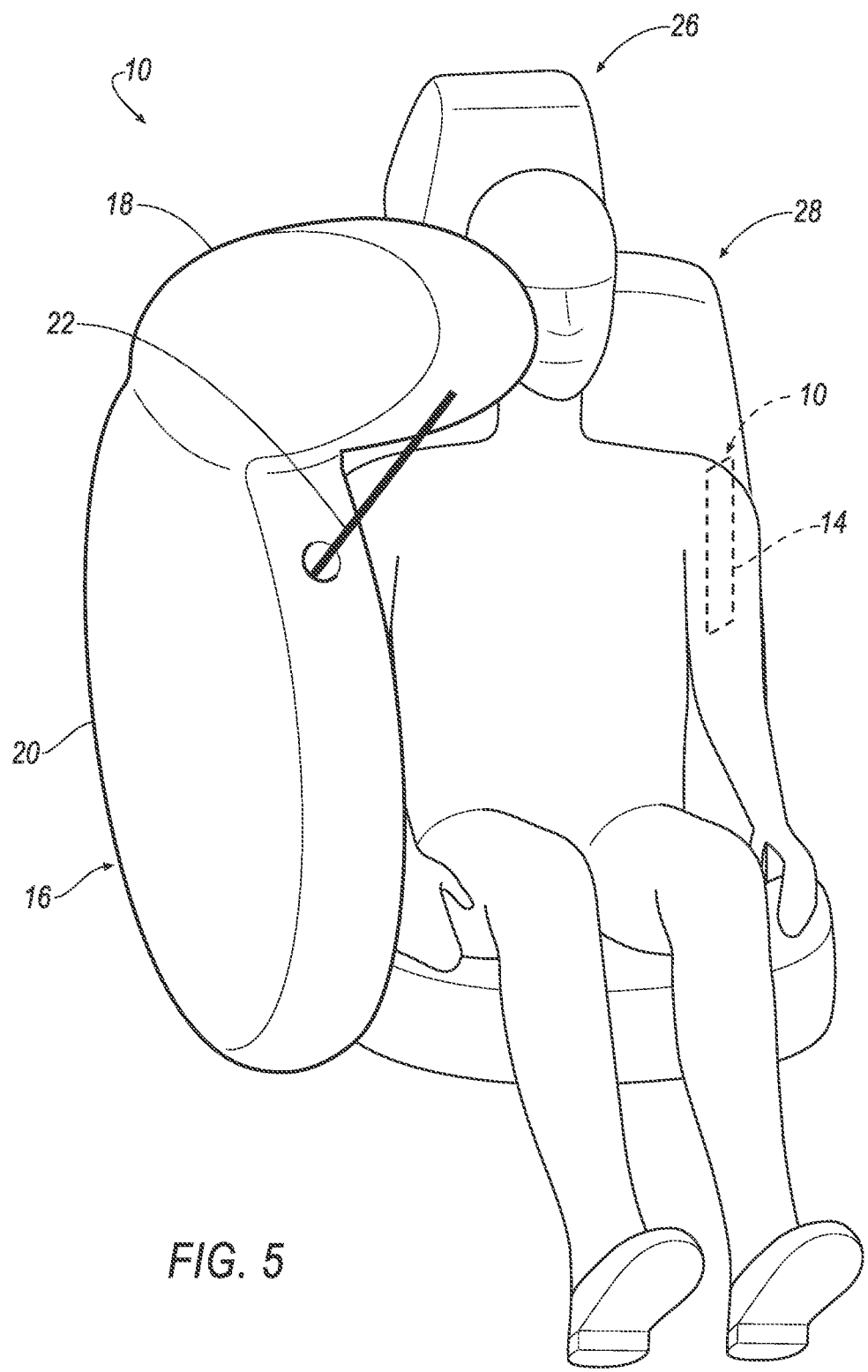
FIG. 5 is a perspective view of the seat assembly with one of the airbags inflated and with the tethers unreleased.
Figure 6:
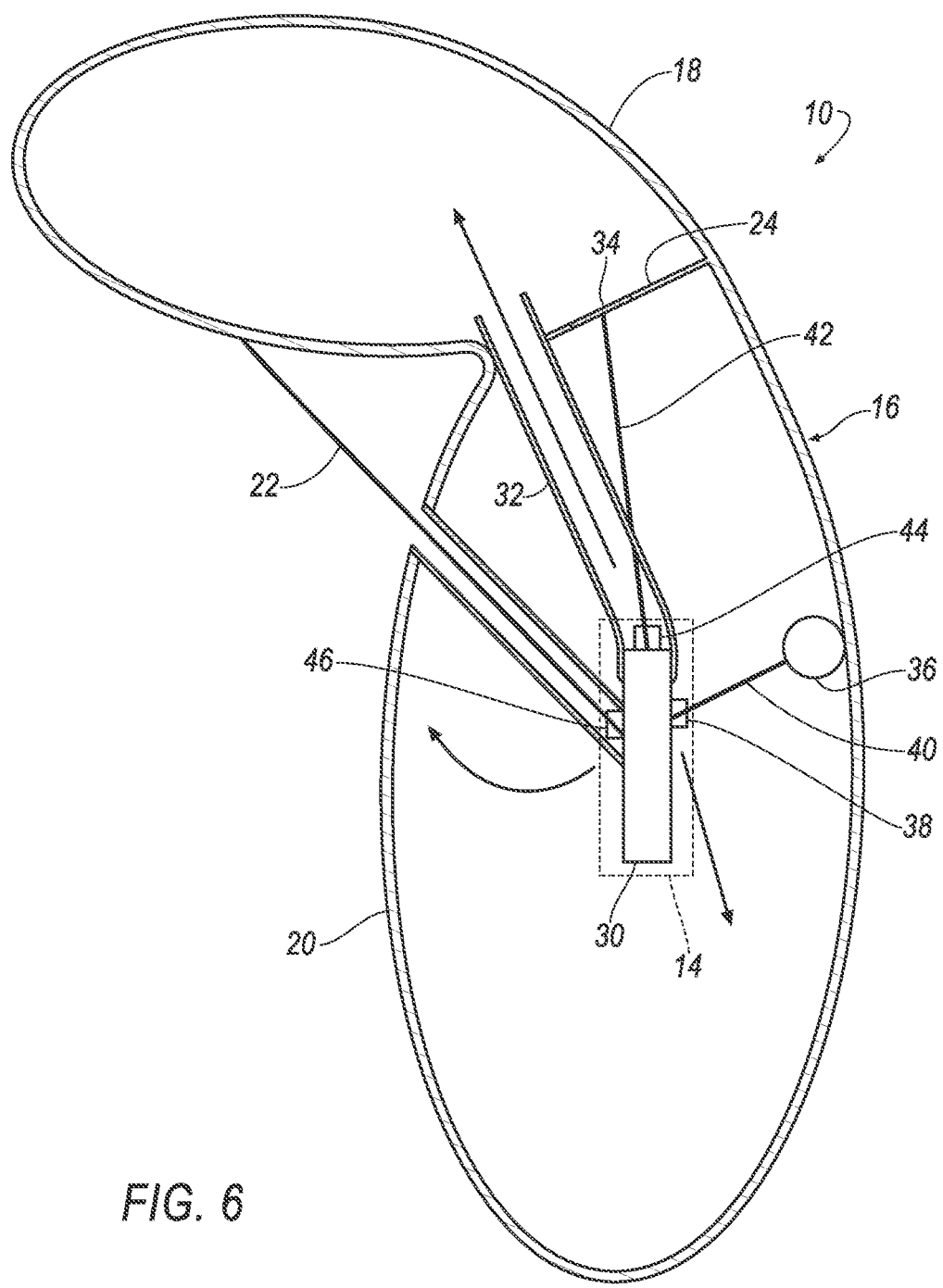
FIG. 6 is a cross-sectional view of the airbag of FIG. 5.

For a far-side impact, the airbag closest to the impact, i.e., the side airbag 16 on the inboard side of the seat assembly 26, may be inflated with the upper lobe 18 in the unrestrained position, the lower lobe 20 at a relatively increased stiffness, and the upper lobe 18 at a relatively decreased stiffness. As an example, the seat assembly 26 in FIGS. 5 and 6 may be located on left side of the vehicle 12 and facing forward during a near-side impact, i.e., an impact on the right side of the vehicle 12. In such an example, the upper lobe 18 may be in the retrained position and the vents 34, 36 may be closed to reduce exhaust of gas from the lower lobe 20 and to reduce the amount of gas supplied to the upper lobe 18.

As set forth above, the vehicle 12 may include a computer 50. The computer 50 may be the ADAS computer of the vehicle 12 described above or a separate computer. The computer 50, implemented via circuits, chips, or other electronic components, is included in a vehicle 12 control system for carrying out various operations, including as described herein. The computer 50 is a computing device that generally includes a processor and a memory, the memory including one or more forms of computer 50-readable media and storing instructions executable by the processor for performing various operations, including as disclosed herein. The memory of the computer 50 further generally stores remote data received via various communications mechanisms; e.g., the computer 50 is generally configured for communications on a controller area network (CAN) bus or the like, and/or for using other wired or wireless protocols, e.g., Bluetooth, etc. The computer 50 may also have a connection to an onboard diagnostics connector (OBD-II). Via a communication network using Ethernet, WiFi, the CAN bus, Local Interconnect Network (LIN), and/or other wired or wireless mechanisms, the computer 50 may transmit messages to various devices in the vehicle 12 and/or receive messages from the various devices, e.g., controllers, actuators, sensors, etc., e.g., controllers and sensors as discussed herein. For example, the computer 50 may receive data from vehicle sensors.

The communication network includes hardware, such as a communication bus, for facilitating communication among vehicle 12 components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The computer 50 may be in communication with the communication network of the vehicle 12 to send and/or receive instructions to and from components of the vehicle 12. The computer 50 may be a microprocessor-based controller implemented via circuits, chips, or other electronic components. For example, the computer 50 may include the processor, memory, etc. The memory of the computer 50 may include memory storing instructions executable by the processor as well as for electronically storing data and/or databases.

Figure 8:
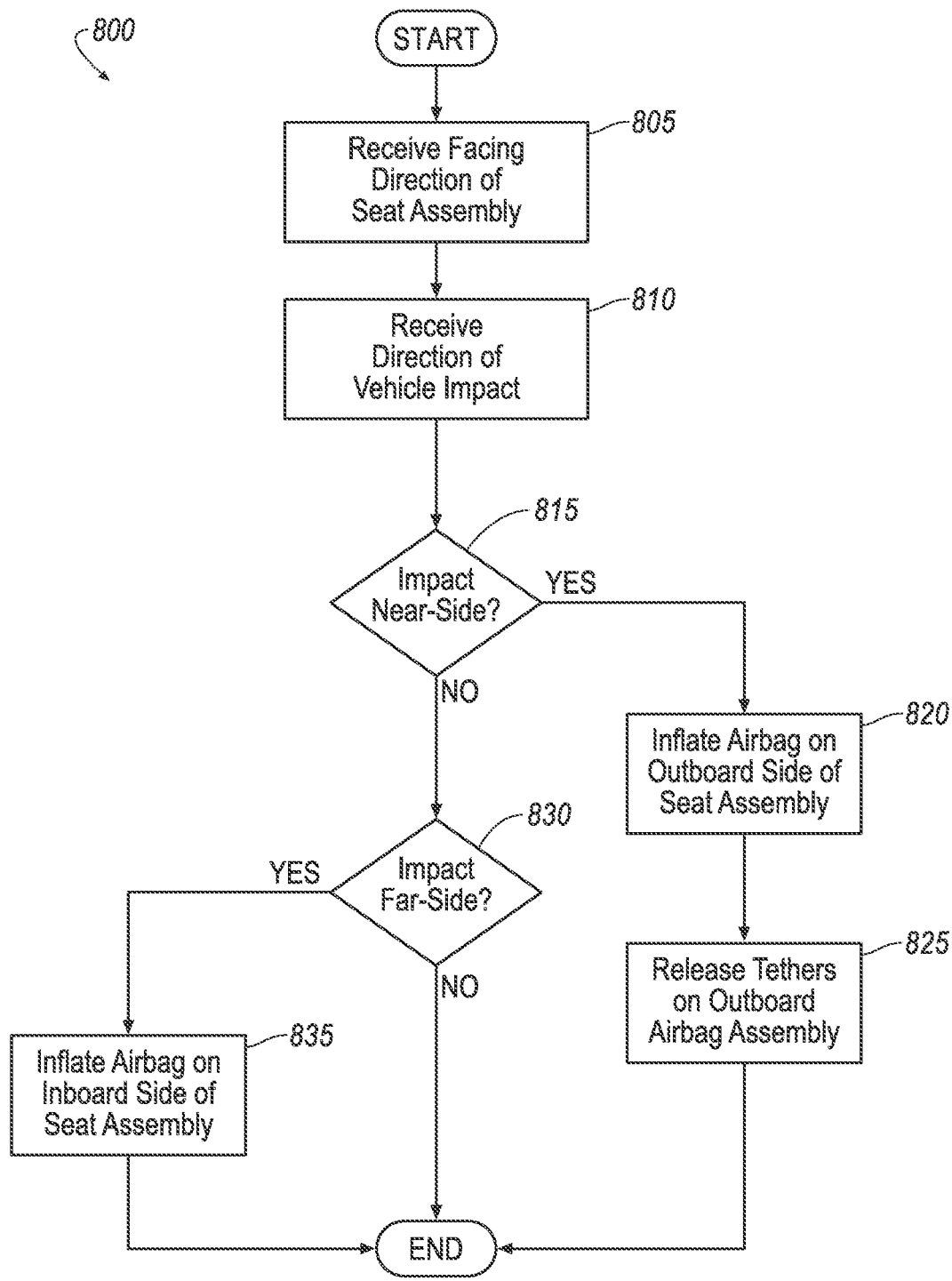
FIG. 8 is a flow chart of a method.

The computer 50 is programmed to perform the method 800 shown in FIG. 8. Specifically, the memory stores instructions executable by the processor to perform the method 800. The computer 50 is programmed to selectively inflate the side airbag 16 based at least on a direction of the vehicle impact. For example, in the examples in which the seat assembly 26 includes two airbag assemblies 26, the computer 50 is programmed to inflate one of the airbag assemblies 26 and/or the other of the airbag assemblies 26 based on at least a direction of a vehicle impact and/or the facing direction of the seat assembly 26. The computer 50 is also programed to control the position and/or relative pressure of the lower lobe 20 and the upper lobe 18 based on at least a direction of a vehicle impact and/or the facing direction of the seat assembly 26.

Figure 7:
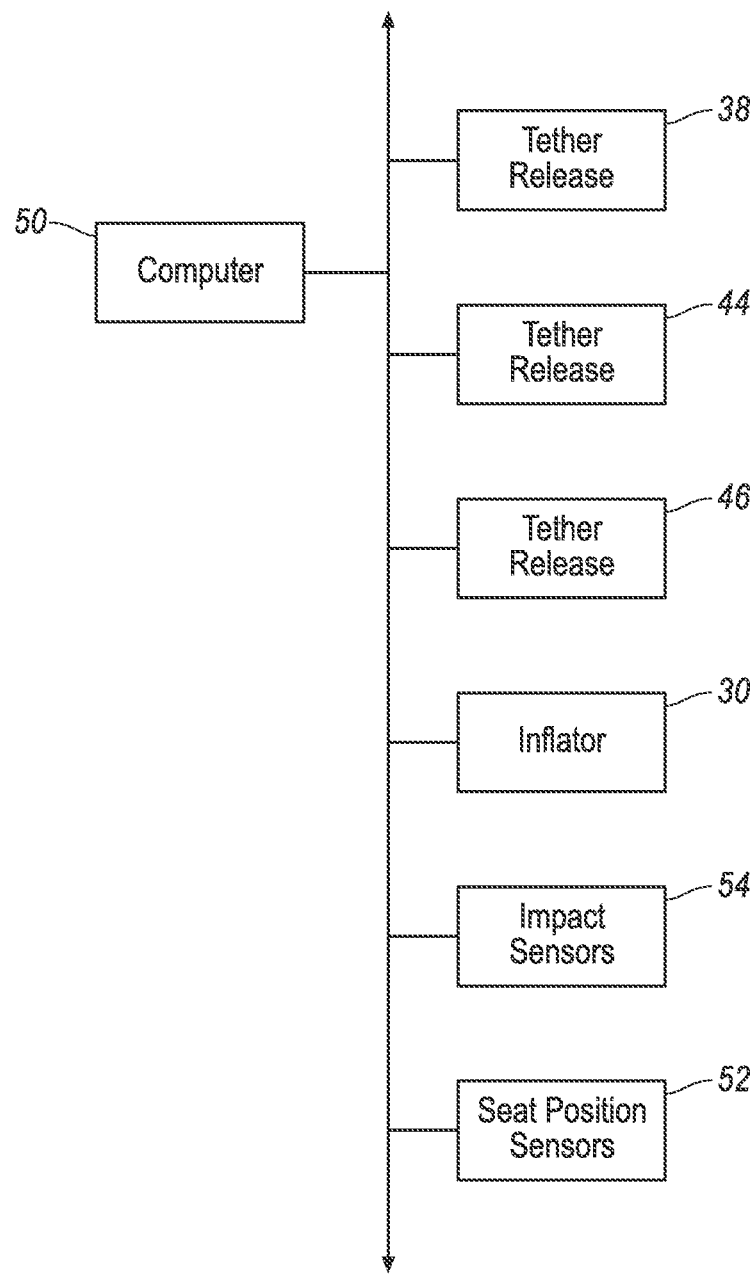
FIG. 7 is a schematic of components of a system of the vehicle.

With reference to block 805, the method includes receiving the facing direction of the seat, e.g., a signal indicating the facing direction. For example, the vehicle 12 may include a seat position sensor 52 (FIG. 7) that detect the facing position of the seat assembly 26. The seat position sensors 52 may be any suitable in the seat assembly 26 (e.g., rotary encoders, Hall-effect sensors, etc.) or exterior to the seat assembly 26 (including cameras, image sensors, etc.). The computer 50 is programmed to receive the facing direction of the seat assembly 26, e.g., from the seat position sensor 52.

With reference to block 810, the method includes receiving an indication of a direction of impact to the vehicle 12, e.g., a signal indicating the direction of impact. Specifically, the vehicle 12 may include at least one impact sensor 54 for sensing impact and direction of impact of the vehicle 12, and a computer 50 in communication with the impact sensor 54 and the inflator 30s. Alternatively or additionally to sensing impact, the impact sensor 54 may be configured to sense impact prior to impact, i.e., pre-impact sensing. The impact sensor 54 may be in communication with the computer 50. The impact sensor 54 is configured to detect an impact to the vehicle 12. The impact sensor 54 may be of any suitable type, for example, post-contact sensors such as accelerometers, pressure sensors, and contact switches; and pre-impact sensor 54s such as radar, LIDAR, and vision-sensing systems. The vision-sensing systems may include one or more cameras, CCD image sensors, CMOS image sensors, etc. The impact sensor 54 may be located at numerous points in or on the vehicle 12. The computer 50 is programmed to receive the direction of impact, e.g., from the impact sensor 54.

The computer 50 is programmed to selectively inflate one of the side airbags 16 based on at least detection of a near-side vehicle impact and/or to selectively inflate one of the side airbags 16 based on at least detection of a far-side vehicle impact. With reference to blocks 815 and 830, the method includes determining whether the impact is near-side or far-side relative to the seat assembly 26. This determination is based on the position of the seat in the vehicle 12, i.e., left or right of the longitudinal centerline, the facing direction of the seat assembly 26, and the direction of impact.

The computer 50 is programmed to selectively release the vents 34, 36 of one of the side airbags 16 based on at least the direction of the vehicle impact. If the impact is near-side, with reference to block 820, the side airbag 16 on the outboard side of the seat assembly 26 is inflated and, with reference to block 825, the tethers 22, 40, 42 are released. Specifically, the tether releases 38, 44, 46 are activated. This releases the upper lobe 18 to the unrestrained position, allows exhaust from the lower lobe 20 to the atmosphere and to the upper lobe 18 to decrease the stiffness of the lower lobe 20, and increases the pressure of the upper lobe 18 to increase the stiffness of the upper lobe 18.

With reference to block 835, if the impact is far-side, the airbag on the inboard side of the seat assembly 26 is inflated. Further, the tether releases 38, 44, 46 are not activated. This maintains the upper lobe 18 in the restrained position, prevents exhaust from the lower lobe 20 through the vent, and prevents exhaust from the lower lobe 20 to the upper lobe 18.

Accordingly, the method 800 controls the position of the upper lobe 18 and the relative pressures of the upper lobe 18 and the lower lobe 20. This is based on the direction of impact and the facing direction of the seat assembly 26. The method 800 may be performed independently for each seat assembly 26 of the vehicle 12.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
   a housing;
   a side airbag inflatable to an inflated position, the side airbag in the inflated position having an upper lobe and a lower lobe supporting the upper lobe on the housing;
   the side airbag including an internal panel between the upper lobe and the lower lobe;
   a tether having a first end anchored to the housing and a second end anchored to the upper lobe;
   the airbag including an elongated duct having an opening in the lower lobe and extending into the lower lobe; and
   the tether extending through the elongated duct to the upper lobe.

2. The airbag assembly as set forth in claim 1, further comprising a tether release supported by the housing and connected to the first end of the tether.

3. The airbag assembly as set forth in claim 2, wherein the second end of the tether is connected to an exterior surface of the upper lobe.

4. The airbag assembly as set forth in claim 1, wherein the second end of the tether is connected to an exterior surface of the upper lobe.

5. The airbag assembly as set forth in claim 1, wherein the first end of the tether is in the elongated duct.

6. The airbag assembly as set forth in claim 1, further comprising a tether release supported by the housing and connected to the first end of the tether in the elongated duct.

7. The airbag assembly as set forth in claim 1, wherein the internal panel fluidly separates the upper lobe from the lower lobe, and further comprising an inflator and a diffuser extending from the inflator through the internal panel to the upper lobe.

8. The airbag assembly as set forth in claim 1, wherein the internal panel has a vent.

9. The airbag assembly as set forth in claim 8, further comprising a second tether having a first end anchored to the housing and a second end anchored to the vent.

10. The airbag assembly as set forth in claim 9, further comprising a second tether release supported by the housing and connected to the first end of the second tether.

11. The airbag assembly as set forth in claim 8, wherein the vent is a non-return vent.

12. The airbag assembly as set forth in claim 1, wherein the upper lobe has an outer wall that is substantially impermeable to inflation medium.

13. A system comprising:
a seat including a seatback a first side and a second side;
a first side airbag on the first side of the seat and a second side airbag on the second side of the seat;
the first side airbag and the second side airbag each including a lower lobe, an upper lobe, and an external tether restraining the upper lobe; and
a computer programmed to:
selectively inflate the first side airbag and/or the second side airbag based on at least a direction of a vehicle impact; and
selectively release the external tether of one of the first side airbag or the second side airbag based on at least the direction of vehicle impact.

14. The system as set forth in claim 13, wherein the computer is programmed to selectively inflate one of the first side airbag or the second side airbag based on at least detection of a near-side vehicle impact and/or to selectively inflate the other of the first side airbag or the second side airbag based on at least detection of a far-side vehicle impact.

15. The system as set forth in claim 13, wherein the seat is rotatable between a forward position and a rearward position and the computer is programmed to selectively inflate the first side airbag or the second side airbag based on at least a position of the seat in one of the forward position and the rearward position.

16. The system as set forth in claim 13, wherein the first side airbag and the second side airbag each include a lower lobe, and upper lobe, an internal panel between the lower lobe and the upper lobe, the internal panel including a vent, and wherein the computer is programmed to selectively release the vent of one of the first side airbag and the second side airbag based on at least the direction of the vehicle impact.

17. The system as set forth in claim 16, wherein the first side airbag and the second side airbag each include an external vent in the lower lobe, and wherein the computer is programmed to open the external vent of one of the first side airbag or the second side airbag based on at least the direction of the vehicle impact.

18. The system as set forth in claim 17, wherein:
the first airbag is on an inboard side of the seat and the second airbag is on an outboard side of the seat; and
the computer is programmed to, for a near side impact:
inflate the second airbag;
release the external tether of the second airbag; and
release the vent of the second airbag and the external vent of the second airbag.

19. The system as set forth in claim 17, wherein:
the first airbag is on an inboard side of the seat and the second airbag is on an outboard side of the seat; and
the computer is programmed to, for a far side impact:
inflate the first airbag;
retain the external tether of the first airbag in an unreleased position; and
retain the vent of the first airbag and the external vent of the first airbag in closed positions.

20. The system as set forth in claim 13, wherein the first airbag and the second airbag each include an elongated duct having an opening in the lower lobe and extending into the lower lobe with the external tether extending through the elongated duct to the upper lobe.

* * * * *